June 27, 1933.  H. J. YORK  1,915,508
NEST
Filed May 28, 1932   3 Sheets-Sheet 1
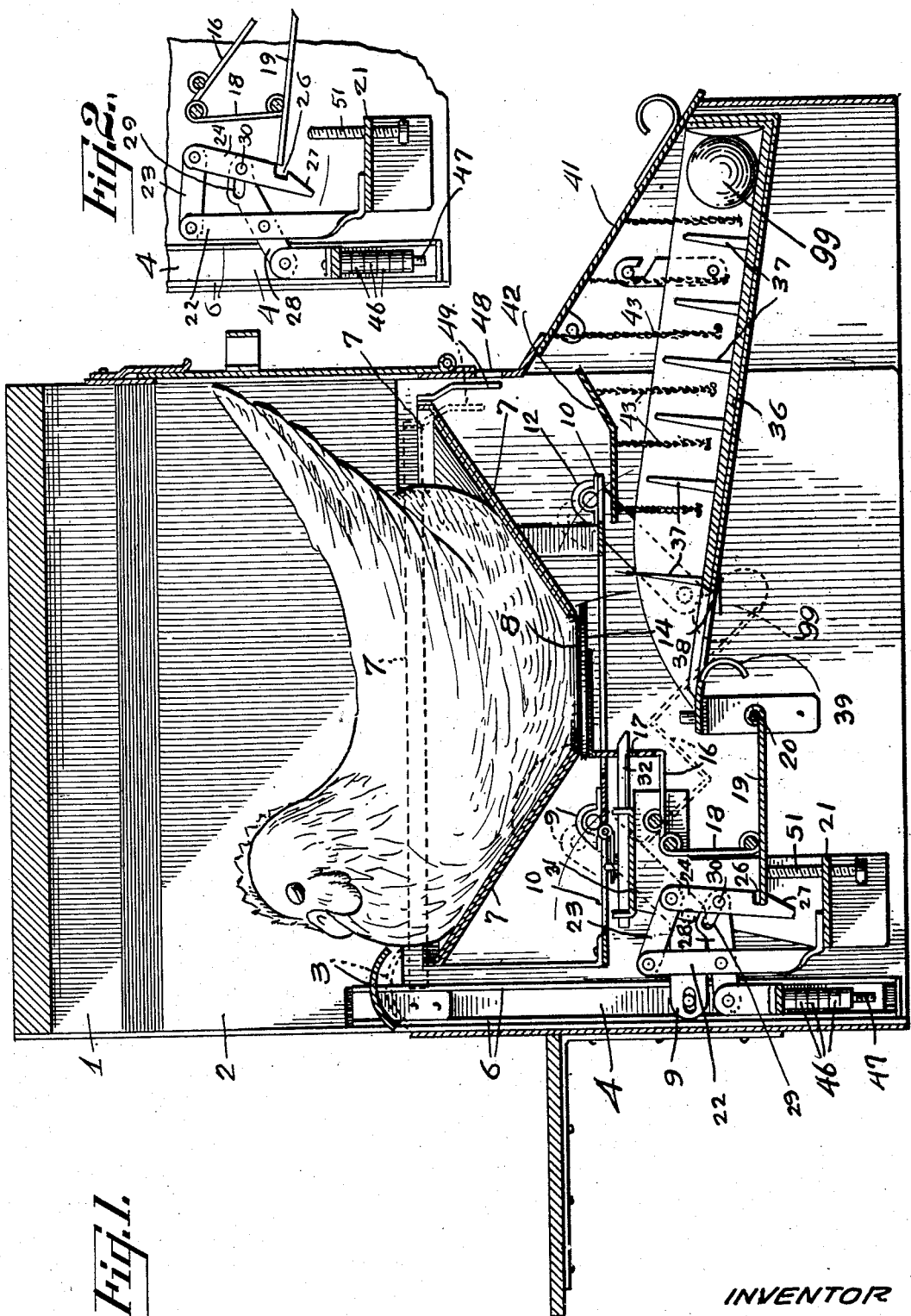
INVENTOR
HENRY J. YORK
BY Arthur L. Slee
HIS ATTORNEY.

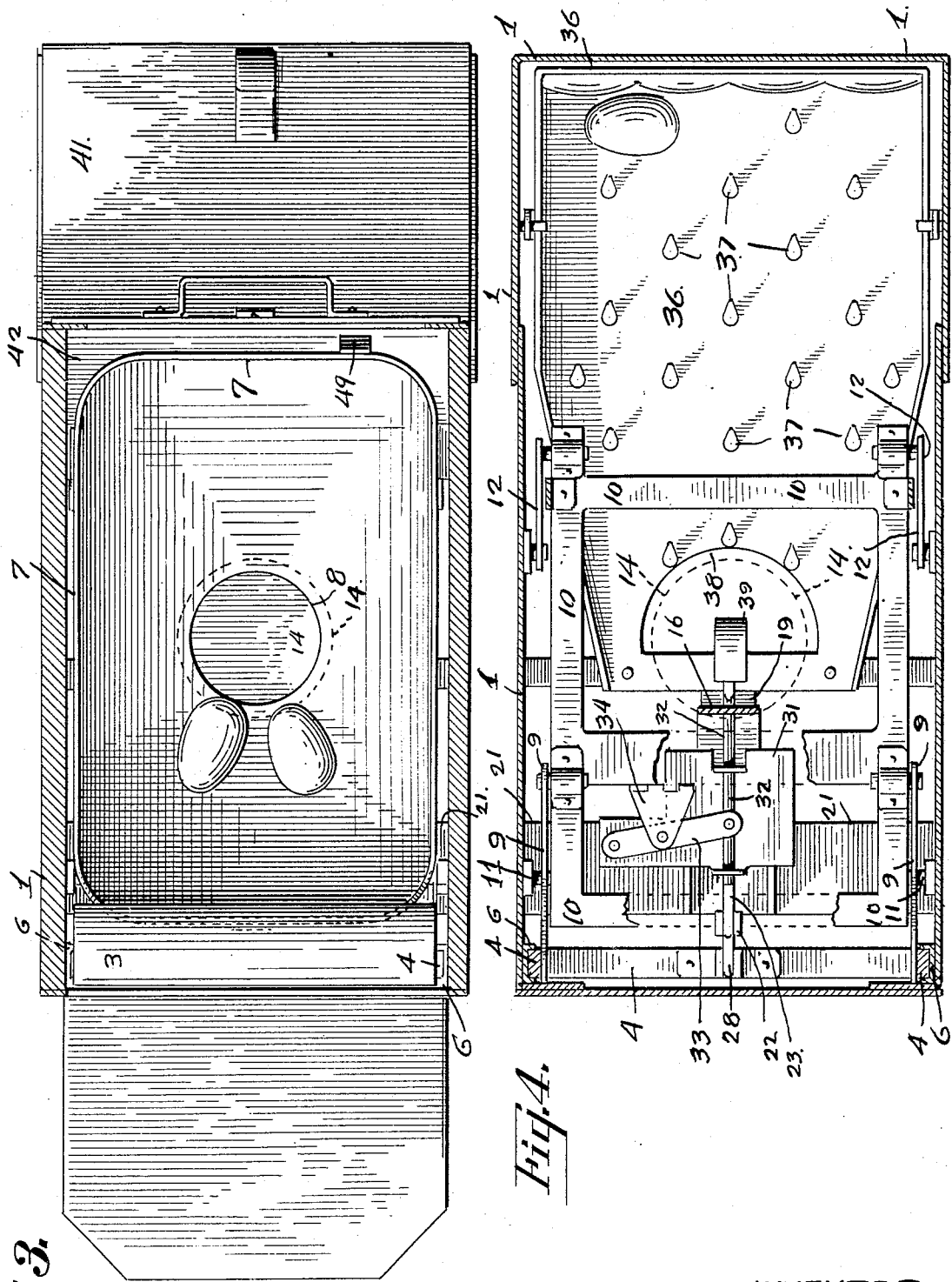

June 27, 1933. H. J. YORK 1,915,508
NEST
Filed May 28, 1932 3 Sheets-Sheet 3

INVENTOR
HENRY J. YORK
BY Arthur L. Slee
HIS ATTORNEY.

Patented June 27, 1933

1,915,508

UNITED STATES PATENT OFFICE

HENRY J. YORK, OF SAN FRANCISCO, CALIFORNIA

NEST

Application filed May 28, 1932. Serial No. 614,103.

My invention relates to improvements in hens' nests wherein said nest, provided with an aperture in the bottom thereof for releasing new-laid eggs therefrom, operates in conjunction with a trap for normally closing said aperture and with means for automatically releasing and opening said trap to permit the passage of a new-laid egg from the nest and into a separate cushioned compartment to prevent soiling of said new-laid egg, and also with means for separating soft-shell eggs from hard-shell or normal eggs, to prevent soiling of the latter by breakage of the former.

The primary object of the present invention is to provide a new and improved nest having improved means for automatically removing a new-laid egg therefrom to prevent said egg from becoming soiled by excrement, or other matter, within the nest.

Another object of the present invention is to provide a new and improved nest of the character described, having improved means for separating soft-shelled eggs from hard-shelled eggs to prevent the latter from becoming soiled by breakage of the former.

A further object is to provide improved means for keeping eggs clean in order to eliminate the labor and expense of washing said eggs and the loss thru breakage incident to such washing.

A still further object is to provide a new and improved nest of the character set forth having improved means for locking the trap while the hen is upon the nest to prevent the said hen from accidentally placing her foot thru the trap.

A still further object is to provide new and improved means actuated by the weight of the hen when leaving the nest for automatically releasing a new-laid egg from said nest before a subsequent entrance to prevent said egg from becoming soiled.

I accomplish these and other objects by means of the improved device disclosed in the drawings forming a part of the present application, wherein like characters of reference are used to designate similar parts thruout the specification and drawings, and in which—

Fig. 1 is a longitudinal vertical sectional view of my improved nest disclosing the position of the several parts when a hen is upon the nest;

Fig. 2 is a broken detailed view disclosing the position of the retaining or locking latch, after the same has been released by the weight of the hen upon the perch when leaving the nest;

Fig. 3 is a horizontal sectional view of the device, taken above the nest;

Fig. 4 is a similar view disclosing the actuating mechanism below the nest;

Figures 5, 6:
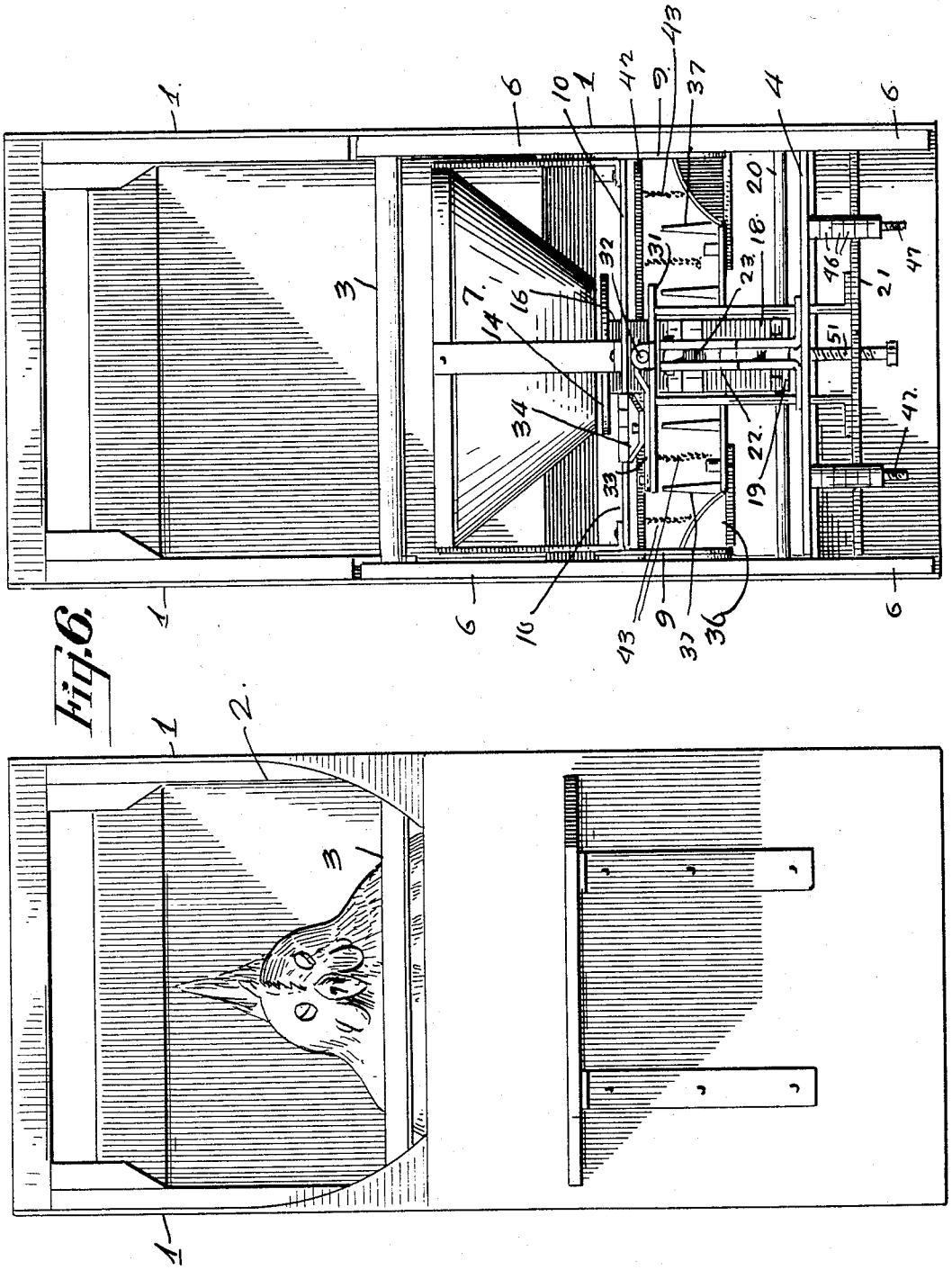
Fig. 5 is a front end elevation of the nest disclosing the entrance thereto.
Fig. 6 is a similar view with the front end removed, disclosing the operating mechanism.

Referring to the drawings, the numeral 1 is used to designate in general a housing having an entrance 2 in one end thereof. A perch 3 extends across the lower edge of said opening or entrance 2 and is mounted upon the top of a frame 4 slidably mounted within vertical guides 6 secured to opposite sides of the housing 1, as disclosed in Figs. 1 and 4 of the drawings.

A preferably cone-shaped nest 7, provided with a centrally disposed aperture 8 in the bottom thereof, is operatively connected to the frame 4 by means of suitable levers 9 pivotally mounted upon the housing 1, as at 11, the opposite ends of said levers 9 being connected to a member 10 upon which the nest 7 is mounted, and the frame 4, to counterbalance one against the other, as disclosed in Fig. 1 of the drawings. Supplemental, or parallel, arms 12 have their ends pivotally connected to the said housing 1 and to the member 10 whereby said member 10 and nest 7 thereon may be constantly maintained in an approximately level position, when lowered or raised, in a manner hereinafter more fully set forth.

A trap 14 is arranged below the aperture 8 of the nest 7 and is attached to one end of an offset lever 16, provided with a locking aperture 17, whose opposite end is connected, by means of a link 18, to an arm 19, pivotally mounted within the housing 1 as at 20.

A cross member 21 supports a bracket 22 having a link 23 pivotally connected to the top of a suspended latch 24 provided with a notch 26 for engaging the end of the arm 19 as disclosed in Fig. 1 of the drawings and for a purpose hereinafter more fully set forth. The latch 24 is provided with a beveled end 27.

A lever 28 is pivotally mounted upon the bracket 23 at its approximate center and has one end pivotally connected to the frame 4 and its other end provided with an inclined slot 29 slidably engaging a pin 30 approximately midway of the latch 24, as disclosed in Fig. 1 of the drawings.

A platform 31 has slidably mounted thereon a bolt 32 which is engaged by a lever 33 actuated by an arm 34 pivotally mounted upon a cross-bar of the frame, or member, 10, as disclosed in Fig. 4 of the drawings.

This bolt 32 is arranged to be moved, when the frame, or member, 10 and nest 7 thereon, is lowered, to move said bolt 32 into the aperture 17 of the lever 16 and thereby lock the trap 14 against movement away from the aperture 8 of the nest 7.

An inclined cushioned receptacle 36 has its upper end arranged directly below the aperture 8 of the nest 7, and is provided with a plurality of preferably staggered resilient pegs or egg-retarding devices 37 to retard the progress of an egg when rolling down the inclined receptacle. Some of these pegs 37 are arranged directly adjacent the edge of an aperture 38 in the upper end of said receptacle 36. The aperture 38 is positioned to receive the trap 14 when fully opened, as disclosed in dotted lines in Fig. 1 of the drawings, so that when a soft egg 99 is laid, these adjacent pegs 37 tend to prevent the entrance to the receptacle 36 of said soft eggs, and the pliable nature of said soft eggs 99 will permit them to pass between the lower end of the trap 14 and the edge of the aperture 38 of the receptacle 36, such a passage being indicated in dotted lines in Fig. 1 of the drawings, while a normal, or hard-shelled, egg will readily depress the soft pegs 37, and, being too large to pass thru the narrow space between the lowered edge of the lowered, or released, trap 14 and the edge of the aperture 38, said hard, or normal, egg will readily roll into the receptacle 36 and, pressing down the soft, resilient, retarding pegs 37, will roll, by the attraction of gravity, into the lower end of said receptacle. A door 41 above said lower end provides access to said receptacle for the purpose of removing eggs therefrom without disturbing a hen upon the nest.

As a further retarding means, I have provided a cross member 42 within the housing 1 from which a plurality of heavy flexible cords 43 are suspended within the path of a rolling egg. Additional cords 43 may be suspended from the under surface of the door 41 and serve as buffers to prevent impact between eggs when rolling into the lower end of the receptacle 36.

In order to balance the nest 7 against the perch 3 so that a slight additional weight on either will operate the mechanism of the nest, the frame 4 is provided with a plurality of counterweights 46 screwed upon a threaded stem 47 depending from the lower portion of said frame 4, as disclosed in Figs. 1 and 6 of the drawings.

In order to regulate the space between the lower edge of the lowered trap 14 and the adjacent edge of the aperture 38 of the receptacle 36, I have provided a readily bendable member 39 projecting into said apertures, as disclosed in Figs. 1 and 4 of the drawings. This member or stop 39 may be bent to various positions and serves as a stop for the trap 14.

A window 48 is provided in the rear end of the housing 1 and a suitably colored tab 49 depends from an adjacent portion of the nest 7 and immediately within said window 48 when said nest is occupied or lowered, but said tab 49 is raised with said nest 7 and moved away from said window 48 when the hen leaves the nest.

This serves as a means for indicating when the nest is occupied so that a hen may not be disturbed when in the performance of her duties.

In order to regulate the position and degree of movement of the trap 14 so that the same will not press too closely against the bottom of the nest 7 and thereby prevent proper engagement of the end of the arm 19 with its notch 27 of the latch 24, an adjusting screw 51 is mounted within the cross member 21 and is screwed up or down to engage the said arm 19 and position the same relatively to said notch 27.

In operation, when a hen enters the nest, she will habitually first perch upon the perch 3 and her weight will depress said perch 3 and frame 4, and thru the action of the levers 9 and 12, slightly raise the member 10 and nest 7 thereon.

As the hen steps from the perch 3 onto the nest 7, said nest and frame 10 will be depressed and the frame 4 and perch 3 thereon will be elevated. As the frame 10 is lowered, the member 34 will be moved in a direction which will cause the lever 33 to move the bolt 32 into the aperture 17 of the lever 16, to which the trap 14 is attached, and lock said lever 16 and trap against movement so that should the hen step upon said trap 14 the same will not be opened.

After the hen has laid an egg she leaves the nest 7, first stepping upon the perch 3 which will be depressed by her weight and the frame 4 will also be lowered and thereby actuate the lever 28 pivotally mounted within the bracket 22, causing said lever 28 to raise the latch 24 and elevate the arm 19 engaging the notch 27, the elevation of said arm 19 moving the trap 14 to the open position indicated in dotted lines in Fig. 1 of the drawings, which will permit the new laid egg to pass thru the aperture 8 of the nest 7 and onto the upper end of the inclined receptacle 36.

It should be understood that the weight of the arm 19 and link 18 connecting it to the lever 16 of the trap 14, is slightly greater than the weight of said lever 16 and trap 14 thereon, so that said trap 14 will normally be held closed by the weight of said arm 19 and link 18. But, the weight of an egg upon said trap 14 will overbalance the arm 19 and link 18 so that the trap 14 will be depressed, or lowered, to deliver an egg thereon into the receptacle 36, as hereinbefore described.

As soon as the egg is delivered from said trap, said trap 14 will return to normal, or closed, position while the latch 24 will be held out of engagement with the end of the arm 19 by the lowered position of the frame 4, as indicated in Fig. 2 of the drawings.

When the nest is again lowered by the weight of a hen therein, the frame 4 will be raised and the latch 24 will be lowered and, as said latch is pivotally suspended from the link 23, the beveled end 27 of said latch 24 will be engaged by the end of said arm 19, as said latch 24 moves downwardly, and said latch will be moved outwardly, such movement being permitted by the movement of the pin 30 within the slot 29 of the lever 28, until the notch 27 of said latch 24 is opposite the end of the arm 19 when said latch will drop and move its notch 27 into engaging relation with the end of the arm 19.

As the nest 7 moves upwardly, the bolt 32 will be withdrawn from the aperture 17, and the action of the latch 24 will release the trap 14 which will be opened by the weight of the egg thereon, and said egg will then be passed thru the aperture 8 of said nest and into the receptacle 36.

When the same, or another, hen again enters the nest she will first step upon the perch 3 and the operation hereinabove described will be repeated.

Having thus described my invention what I claim as new and desire to secure by Letters Patent is—

1. The combination with a housing having an opening therein for ingress and egress; of an apertured nest mounted within said housing; a perch extending across the bottom of said opening and slidably mounted within said housing; a trap arranged under the nest aperture and normally closing the same; and means actuated by said perch for releasing and opening said trap when said perch is depressed.

2. The combination with a housing having an opening therein for ingress and egress, of an apertured nest mounted within said housing; a perch extending across the bottom of said opening and slidably mounted for a slight vertical movement within said housing; a trap arranged under the nest aperture and normally closing the same; a latch; and means connected to the perch and latch whereby the latch may be actuated by said perch when depressed, for releasing and opening said trap to release an egg from said nest.

3. The combination with a housing having an entrance, of a centrally apertured cone-shaped nest pivotally mounted within said housing for an up and down movement; a perch slidably mounted for vertical movement within said housing and arranged across the bottom of said entrance; means connecting said perch and nest to balance one with the other; a trap arranged under the nest aperture and normally closing the same; and means actuated by said perch when depressed for releasing and opening said trap to release an egg from said nest thru the aperture thereof.

4. The combination with a housing having an entrance, of a centrally apertured cone-shaped nest pivotally mounted within said housing for an up and down movement; a perch slidably mounted for vertical movement within said housing and arranged across the bottom of said entrance; means connecting said perch and nest to balance one with the other; a trap arranged under the nest aperture and normally closing the same; means actuated by said perch when depressed for releasing and opening said trap to release an egg from said nest thru the aperture thereof; and means actuated by said nest when lowered for locking said trap against opening and for releasing said trap when said nest is raised.

5. The combination with a housing having an entrance; of a centrally apertured cone-shaped nest pivotally mounted for movement within said housing; a perch slidably mounted within said housing and arranged across the bottom of said entrance; means connecting said nest and perch to balance one with the other; a trap arranged under the aperture of the nest and normally closing the same; an inclined cushioned receptacle having an aperture in its upper end arranged under the nest aperture to permit the passage of the trap into said receptacle aperture and with the lower edge of said trap below the edge of said receptacle aperture a distance less than the minor axis of an egg, whereby normal hard-shelled eggs may be delivered from said trap into said receptacle and pliable soft-shelled eggs may pass thru the space between the lower edge of said trap and the edge of said receptacle aperture and thereby be separated from said hard-shelled, or normal, eggs; and means actuated by said perch when depressed for releasing said trap and opening the same whereby an egg may be delivered from said nest into said receptacle.

6. The combination with a housing having an entrance; of a centrally apertured cone-shaped nest pivotally mounted for movement within said housing; a perch slidably mounted within said housing and arranged across the bottom of said entrance; means connecting said nest and perch to balance one with the other; a trap arranged under the aperture of the nest and normally closing the same; an inclined cushioned receptacle having an aperture in its upper end arranged under the nest aperture to permit the passage of the trap into said receptacle aperture and with the lower edge of said trap below the edge of said receptacle aperture a distance less than the minor axis of an egg, whereby normal hard-shelled eggs may be delivered from said trap into said receptacle and pliable soft-shelled eggs may pass thru the space between the lower edge of said trap and the edge of said receptacle aperture and thereby be separated from said hard shelled, or normal, egg; means actuated by said perch when depressed for releasing said trap and opening the same whereby an egg may be delivered from said nest into said receptacle; and resilient retarding means within said receptacle for retarding the passage of eggs therein and for preventing violent impact of one egg with another within said receptacle.

HENRY J. YORK.